United States Patent
Baney et al.

(10) Patent No.: US 7,633,633 B2
(45) Date of Patent: Dec. 15, 2009

(54) POSITION DETERMINATION THAT IS RESPONSIVE TO A RETRO-REFLECTIVE OBJECT

(75) Inventors: Douglas M. Baney, Los Altos, CA (US); Marshall T. DePue, San Mate, CA (US); Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 966 days.

(21) Appl. No.: 10/652,638

(22) Filed: Aug. 29, 2003

(65) Prior Publication Data

US 2005/0068518 A1 Mar. 31, 2005

(51) Int. Cl.
*G01J 4/00* (2006.01)
*G01C 1/00* (2006.01)

(52) U.S. Cl. .............. 356/623; 356/3.1; 356/152.3; 356/364

(58) Field of Classification Search ............ 356/5.11, 356/623
See application file for complete search history.

(56) References Cited

U.S. PATENT DOCUMENTS

| | | | |
|---|---|---|---|
| 4,184,767 A | 1/1980 | Gardner et al. | |
| 5,128,794 A * | 7/1992 | Mocker et al. | 359/196 |
| 5,309,212 A * | 5/1994 | Clark | 356/5.09 |
| 6,008,798 A | 12/1999 | Mato, Jr. et al. | |
| 6,031,613 A * | 2/2000 | Washington | 356/364 |
| 6,111,563 A | 8/2000 | Hines | |
| 6,297,513 B1 | 10/2001 | Oliver et al. | |
| 6,415,043 B1 | 7/2002 | Josefsson | |
| 6,442,416 B1 * | 8/2002 | Schultz | 600/429 |
| 6,476,970 B1 | 11/2002 | Smith | |
| 2004/0135992 A1 * | 7/2004 | Munro | 356/4.01 |

FOREIGN PATENT DOCUMENTS

| | | |
|---|---|---|
| EP | 0 270 909 | 6/1988 |
| EP | 0 366 112 | 5/1990 |
| EP | 1 100 041 | 5/2001 |

OTHER PUBLICATIONS

Search report from corresponding application No. 04 010 829.2 dated Nov. 2, 2006.

* cited by examiner

*Primary Examiner*—Gregory J Toatley, Jr.
*Assistant Examiner*—Tara S Pajoohi

(57) ABSTRACT

Utilizing frequency-dependent diffraction (also referred to as dispersion) to determine the angular position of a retro-reflective object within a scanning space. The technique involves dispersing an electromagnetic beam into a scanning space by frequency. If a retro-reflective object is located within the scanning space, the object will retro-reflect a portion of the dispersed beam having a frequency that is associated with the angular position of the retro-reflective object within the scanning space. The frequency of the retro-reflected beam is used to determine the angular position of the retro-reflective object within the scanning space. When a second beam is dispersed into the scanning space and a portion of the second beam is retro-reflected in the manner just described, a second angular position of the retro-reflective object can be found. Coordinates of the retro-reflective object are determinable by triangulation using the two angular positions. These are absolute, as opposed to relative, coordinates.

15 Claims, 6 Drawing Sheets

POSITION DETERMINATION THAT IS RESPONSIVE TO A RETRO-REFLECTIVE OBJECT

FIELD OF THE INVENTION

The present invention relates generally to position determination systems, and more particularly to optical position determination systems.

BACKGROUND OF THE INVENTION

Mechanical mice are well known to computer users as a useful tool for positioning a cursor and selecting functions in different applications. These mechanical mice use a ball and related sensors to detect relative motion. However, mechanical mice use relative coordinate tracking, typically have moving parts, are limited to two-dimensional position input, have low resolution, and only work on certain surfaces.

Optical mice use light to detect relative motion. Typically, an optical mouse has a light source, such as a light emitting diode (LED), for illuminating a surface, such as a mouse pad or surface of a table. The light strikes the surface and a portion of the light is reflected. The optical mouse has an on-board detector for detecting the reflected light. Based on the reflected light, an electronic computation unit determines the relative motion of the optical mouse. While optical mice overcome some of the limitations of mechanical mice, they too are limited to two-dimensional position input, use relative coordinate tracking, and do not work on certain surfaces, such as mirrors. Moreover, the LED and electronic computation necessitates the use of a power source in optical mice.

SUMMARY OF THE INVENTION

A technique for position determination utilizes frequency-dependent diffraction (also referred to as dispersion) to determine the angular position of a retro-reflective object within a scanning space. The technique involves dispersing an electromagnetic (EM) beam into a scanning space by frequency. If a retro-reflective object is located within the scanning space, the object will retro-reflect a portion of the dispersed beam having a frequency that is associated with the angular position of the retro-reflective object within the scanning space. The frequency of the retro-reflected beam is used to determine the angular position of the retro-reflective object within the scanning space. When a second beam is dispersed into the scanning space and a portion of the second beam is retro-reflected in the manner just described, a second angular position of the retro-reflective object can be found. Coordinates of the retro-reflective object are determinable by triangulation using the two angular positions. These are absolute, as opposed to relative, coordinates. Spatial (three-dimensional) coordinates of the retro-reflective object are determinable by triangulation using three or more angular positions.

BRIEF DESCRIPTION OF THE DRAWINGS

Throughout the description, similar reference numbers may be used to identify similar elements.

DETAILED DESCRIPTION OF THE INVENTION

Figure 1:
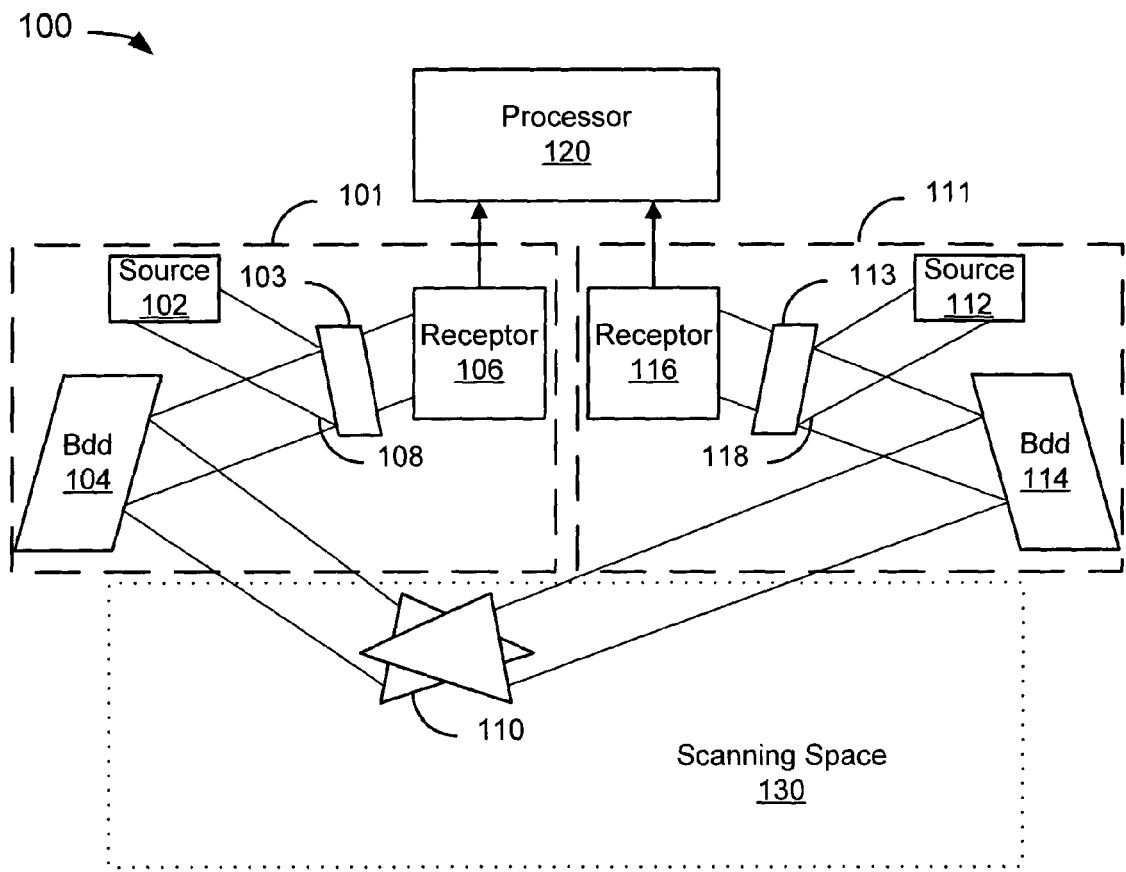
FIG. 1 is a block diagram of a position determination system that is responsive to a retro-reflective object according to the invention.

As shown in the drawings for the purposes of illustration, the invention involves position determination. In an embodiment, the invention relies on frequency-dependent diffraction to determine an angular position of a retro-reflective object within a scanning space.

FIG. 1 is a block diagram of a position determination system 100 that is responsive to a retro-reflective object 110 located within a scanning space 130 according to the invention. The purpose of FIG. 1 is to illustrate how coordinates of the retro-reflective object 110 are calculated using frequency values of dispersed beams that are associated with respective radial portions of the scanning space 130. Using the frequency values, the system 100 can calculate angular positions of the retro-reflective object 110 and triangulate coordinates of the retro-reflective object 110 using the angular positions. (The relationship between the frequency values of the dispersed beams and the radial position of the retro-reflective object 110 within the scanning space 130 is described later with reference to FIGS. 2A and 2B. Until the relationship is described, it is simply assumed that such a relationship exists.)

The system 100 includes a first angular position determination subsystem 101, a second angular position determination subsystem 111, and a processor 120. Processors are well known in the computer arts. Accordingly a detailed description of the processor 120 is not provided herein. It should be noted, however, that processors are typically coupled to storage media that includes instructions for executing functions. The storage medium may or may not be necessary if the instructions are implemented in hardware. Accordingly, the processor 120, as used herein, could be a hardware device with no associated storage medium (other than optional registers). Moreover, the processor 120, as used herein, could actually be a multi-processor or multiple processors.

The processor 120 receives as input the output of the two subsystems 101 and 111. In an embodiment, the output of the two subsystems 101 and 111 are frequency values. The processor 120 determines angular positions of the retro-reflective object 110 that correspond to the frequency values. The processor 120 then uses the angular positions to triangulate coordinates of the retro-reflective object 110 and thereby determine the position of the retro-reflective object 110. In an alternative embodiment, the subsystems 101 and 111 have independent processors (not shown) that determine angular position from a frequency and output the angular position to the processor 120, which uses the angular positions to triangulate coordinates of the retro-reflective object 110 and thereby determine the position of the retro-reflective object 110.

In an embodiment, the processor 120 is coupled to an output device, such as a computer monitor (not shown). Since the processor calculates the coordinates of the retro-reflective object 110 within the scanning space 130, movement of the retro-reflective object 110 within the scanning space 130 may be represented on the output device. In an alternative, the movement of the retro-reflective object 110 is recorded in storage media. In another alternative, the retro-reflective object 110 is used as a computer input device. Advantageously, the retro-reflective object 110 may be practically any retro-reflective object, including a retro-reflective mouse or touch screen input device, or even a pen with a retro-reflective surface at the writing end or retro-reflective tape attached to a person's finger or an arbitrary object. The retro-reflective object 110 can be tetherless, consume no power, contain no moving parts, and be as inexpensive as, for example, retro-reflective tape.

The subsystem 101 includes an electromagnetic (EM) source 102, a partially reflective surface 103, a beam dispersion device (BDD) 104, and a receptor 106. The EM source 102 may be a narrowband tunable or swept source, or a broadband optical source, that utilizes a light emitting diode (LED), optical amplifier, incandescent lamp or some other device or devices for providing an EM beam. Exemplary embodiments that utilize broadband and narrowband tunable sources are described later with reference to FIGS. 3A and 3B, respectively. The EM source could also be an optical fiber or some other device for providing an EM beam. The partially reflective surface 103 may be a partially reflective mirror, a polarizing beam splitter, or some other partially reflective surface. Exemplary embodiments that utilize a polarizing beam splitter are described later with reference to FIGS. 3A and 3B. The BDD 104 may be a diffraction grating, a prism, a holographic element, or some other beam dispersion device. Exemplary embodiments that utilize a diffraction grating are described later with reference to FIGS. 3A and 3B. The receptor 106 may be a wavemeter, a photodetector, or some other frequency measuring or EM radiation-detecting device. Exemplary embodiments that utilize a wavemeter and a photodetector are described later with reference to FIG. 3A and FIG. 3B, respectively.

An EM beam that is incident on the retro-reflective object 110 is reflected back in the direction from which it came. Retro-reflection is well-known in optical physics. A retro-reflective object reflects EM radiation in a direction parallel to the incident direction. Retro-reflective objects can be manufactured using angled gold-plated mirrors, or in low cost arrays in the form of geometric shapes on tape or spray.

In operation, the EM source 102 provides an EM beam 108 that is incident on the partially reflective surface 103. A portion of the EM beam 108 is reflected toward the BDD 104. If the EM beam 108 is from a broadband source, the BDD 104 disperses the beam across multiple frequencies. If, on the other hand, the EM beam 108 is from a tunable (or swept) source, then the tunable source provides an EM beam that has a time-dependent variable frequency. In other words, over a period of time, the tunable source should jump through a range of frequencies in turn. The BDD 104 disperses the EM beam at an angle of diffraction that is related to the frequency of the EM beam. After a beam's initial reflection off of the BDD 104, the beam is referred to herein as a "dispersed beam". Because the relationship between frequency and the angle of diffraction are critical to position determination, it is necessary to obtain the frequency-dependent characteristics of the particular dispersion device. The information can be obtained through, for example, diffraction charts, diffraction measurements or other techniques.

Whether the EM beam is from a narrowband or broadband source, the BDD 104 directs the dispersed beam into a scanning space 130. When the retro-reflective object 110 is present within the scanning space 130, assuming the dispersed beam is directed toward the radial portion of the scanning space 130 in which the retro-reflective object 110 is positioned, the retro-reflective object 110 should retro-reflect at least a portion of the dispersed beam back toward the BDD 104. The BDD 104 then redirects the retro-reflected beam toward the partially reflective surface 103. A portion of the retro-reflected beam passes through the partially reflective surface 103 and is detected by the receptor 106. The processor 120 receives the output of the receptor 106, which may be either a frequency value (e.g., from a wavemeter) or simply an indication that an EM signal associated with the retro-reflected beam was detected (e.g., from a photodetector). If the receptor 106 is a wavemeter, it measures a frequency (or wavelength) of the retro-reflected beam. If the receptor 106 is a photodetector, then typically the frequency of the EM beam 108 at a time t should be known so that when the receptor 106 detects the retro-reflected beam at time t the frequency of the retro-reflected beam may be inferred.

The subsystem 111 includes an EM source 112, a partially reflective surface 113, a BDD 114, a receptor 116, and an EM beam 118. The subsystem 111 is like the subsystem 101. Accordingly, only subsystem 101 is described in detail.

As previously mentioned, the subsystems 101 and 111 each determine an angular position of the retro-reflective object 110 (or else output a frequency value from which the processor 120 can determine an angular position). If an additional angular position determination subsystem (not shown) is incorporated into the system 100, a three-dimensional position determination system (not shown) is possible. This system would determine three angular positions of the retro-reflective object 110 and triangulate the spatial coordinates of the retro-reflective object 110 therefrom. Regardless of the number of angular position determination subsystems used, the processor 120 can triangulate the coordinates (spatial coordinates in the case of a three-dimensional embodiment) of the retro-reflective object 110 using the angular positions. Triangulation using angular positions is well-known in the mathematical arts and is not described in detail herein.

Figure 2A:
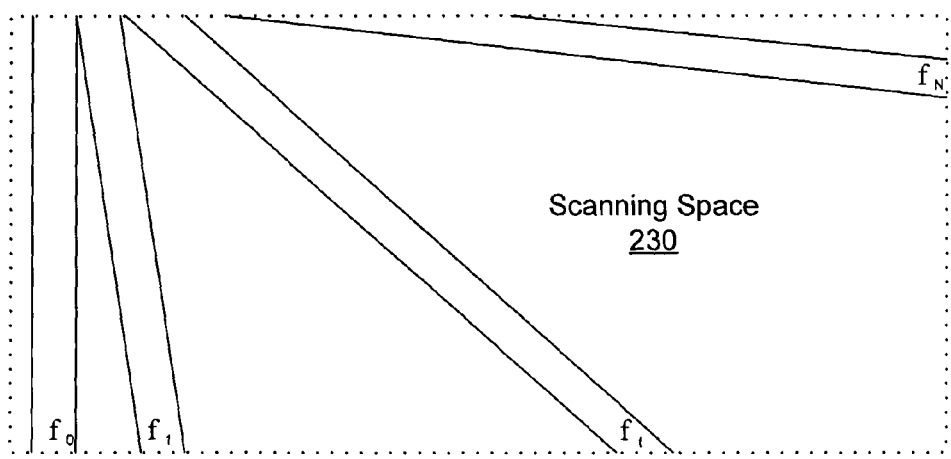
FIGS. 2A and 2B illustrate the relationship between object coordinates and an electromagnetic beam dispersed into a scanning space according to the invention.
Figure 2B:
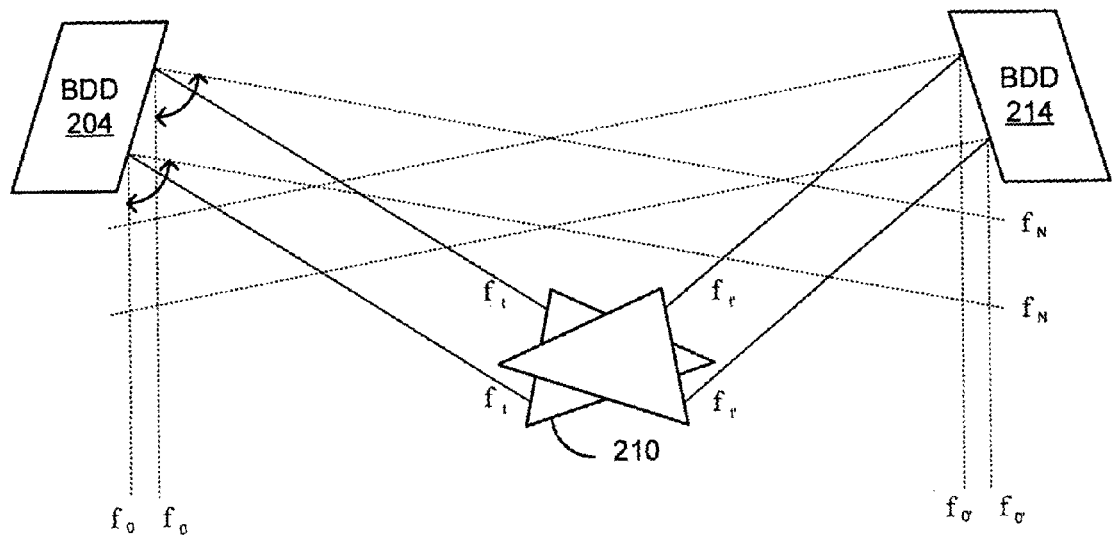

FIGS. 2A and 2B illustrate the relationship between object coordinates and a dispersed beam according to the invention. Specifically, FIG. 2A illustrates the relationship between radial portions of a scanning space 230 and frequencies (or wavelengths) of the respective dispersed beams and FIG. 2B illustrates the relationship between coordinates of a retro-reflective object 210 and frequencies of the respective dispersed beams.

Frequency-dependent dispersion (or diffraction) is a well-known phenomenon. The phenomenon is sometimes illustrated using a prism (a well-known beam dispersion device), with which light is diffracted into a frequency-dependent rainbow pattern. FIG. 2A shows how a frequency-dependent pattern may be spread out over a scanning space 230.

A narrowband tunable (or swept) source can provide an EM beam with a frequency that varies with time. When an EM beam is dispersed into the scanning space 230 over time, a first radial portion of the scanning space 230 may be associated with a time 0 and the last radial portion of the scanning space 230 may be associated with a time N. Accordingly, the dispersed beam at time 0 should have a frequency $f_0$. One time increment later, the dispersed beam should have a frequency $f_1$. At a time t, the dispersed beam should have a frequency $f_t$. At time N, the dispersed beam should have a frequency $f_N$. After time N, the swept source starts over with the frequency $f_0$ (or starts over at some arbitrary frequency between $f_0$ and $f_N$.) In this way, the dispersed beams cover radial portions of the scanning space 230 in such a way that radial portions of the scanning space 230 are associated with a frequency. If a broadband source is used instead of a swept source, the EM beam is dispersed simultaneously into the scanning space 230. Angular displacement of a retro-reflective object is determined as a function of the dispersion angle of a particular frequency, as described with reference to FIG. 2B.

FIG. 2B includes a BDD 204 (similar to BDD 104 of FIG. 1) and a BDD 214 (similar to BDD 114 of FIG. 1). For the purposes of illustration, an EM beam dispersed by the BDD 204 is assumed to come from a narrowband tunable (or swept) source. The BDD 204 disperses the EM beam by frequency. That is, the angle of diffraction of the dispersed beam is a function of the frequency (or wavelength) of the dispersed beam. Using the prism example again as a coarse example, the EM source sweeps from red to violet before starting over again at red (assuming the EM beam is in the visible light frequency range). In this way, at any given time t, the BDD 204 disperses the EM beam into a dispersed beam having a frequency of $f_t$. The dispersed beam is directed toward a radial portion of a scanning area that corresponds to the frequency $f_t$. If the retro-reflective object 210 is in the portion of the scanning area that corresponds to the frequency $f_t$, then the retro-reflective object 210 should retro-reflect the dispersed beam of frequency $f_t$ back toward the BDD 204 and eventually to a receptor (not shown) as described with reference to FIG. 1.

The BDD 214 functions in much the same manner as the BDD 204. In FIG. 2B, frequencies of the dispersed beams dispersed by the BDD 214 are represented as $f_0$, through $f_{N'}$. As previously described, at a time t, the dispersed beam having a frequency of $f_t$ is retro-reflected from the retro-reflective object 210 back toward the BDD 204. Similarly, at a time t', the dispersed beam having a frequency of $f_{t'}$ is retro-reflected from the retro-reflective object 210 back toward the BDD 214. Since each of these frequencies, $f_t$ and $f_{t'}$, are associated with radial positions of the scanning space 230, respective angular positions of the retro-reflective object 210 may be calculated therefrom (assuming the frequencies are measured or otherwise known). Then the coordinates of the retro-reflective object 210 may be triangulated as described previously.

Figure 3A:
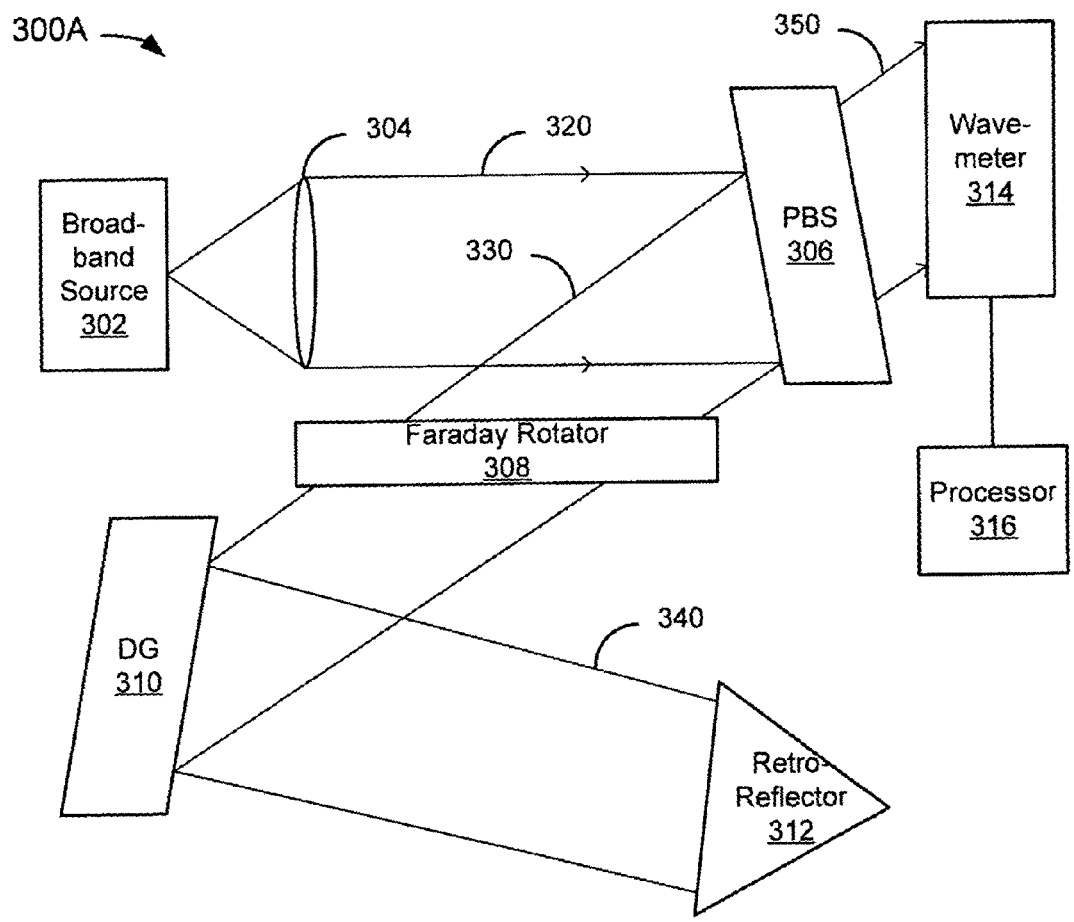
FIGS. 3A and 3B are exemplary block diagrams of angular position determination systems according to the invention.
Figure 3B:
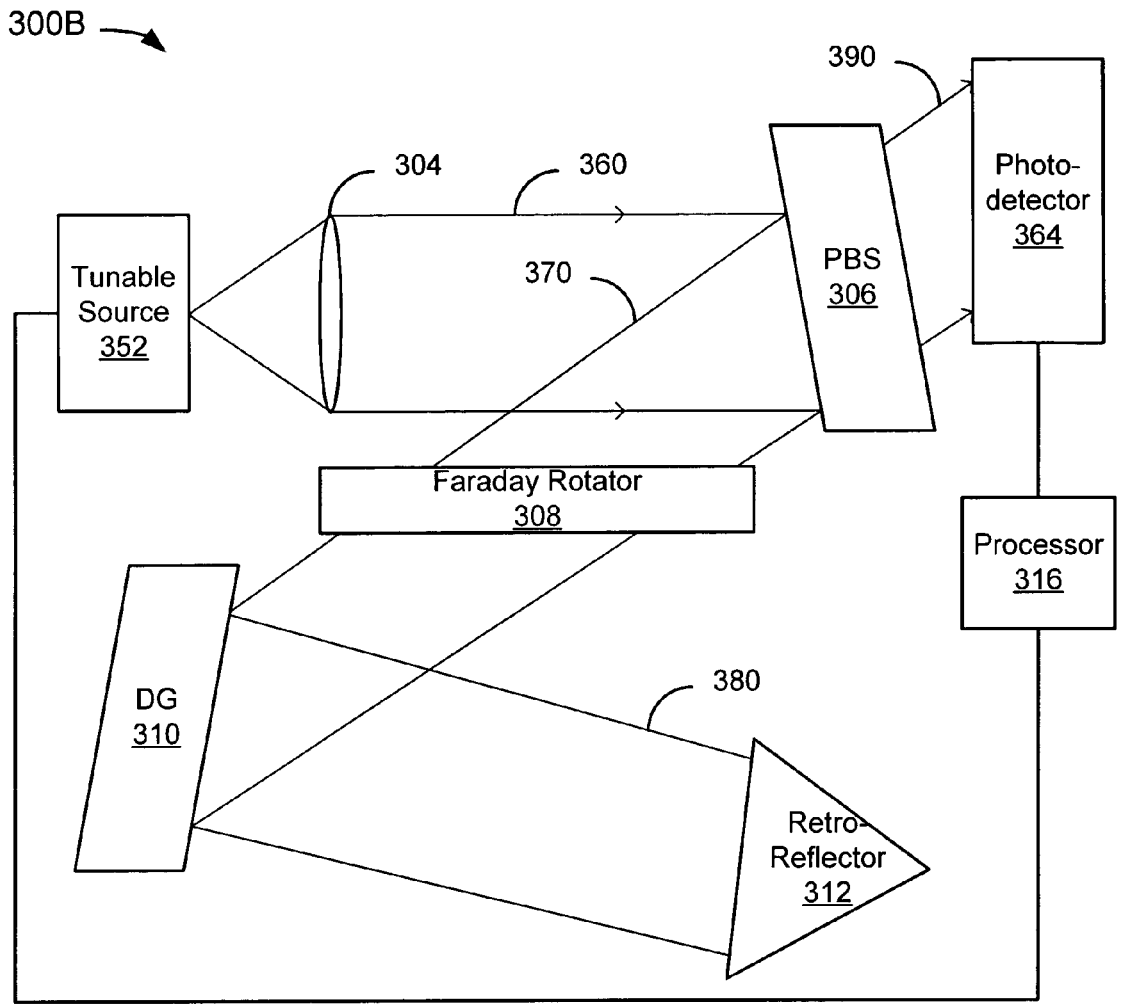

FIGS. 3A and 3B are exemplary block diagrams of angular position determination systems according to the invention. FIG. 3A is intended to illustrate an example of a system 300A that uses a broadband source to determine the position of a retro-reflective object 312. FIG. 3A also illustrates the use of a polarizing beam splitter (PBS) with a Faraday rotator as an embodiment of the partially reflective surface 103 (FIG. 1). Note that the PBS and Faraday rotator combination may be used whether the source is a broadband source, as in FIG. 3A, or a narrowband tunable source, as in FIG. 3B. The system 300A is similar to the subsystem 101 (FIG. 1) described previously. The system 300A includes a broadband source 302, a lens 304, a PBS 306, a Faraday rotator 308, a diffraction grating (DG) 310, a wavemeter 314, and a processor 316.

In operation, the broadband source 302 provides an EM beam to the lens 304, which focuses the beam onto a path 320 toward the PBS 306. The PBS 306 reflects EM radiation having a first polarization state, while allowing EM radiation that has a second polarization state that is orthogonal to the first polarization state to pass through it. The broadband source 302 is presumed for the purpose of this example to provide an EM beam that has the first polarization state. In an alternative, instead of the broadband source 302 providing an EM beam that has the first polarization state, the polarization state of the EM beam may be polarized using a polarizer (not shown) that is located between the broadband source 302 and the PBS 306. In another alternative, the broadband source 302 may provide an unpolarized EM beam, wherein a portion of the EM beam passes through the PBS 306 and a portion of the EM beam is reflected. In any case, the PBS 306 reflects at least a portion of the EM beam along the path 330 toward the Faraday rotator 308. The Faraday rotator 308 rotates the polarization state of the EM beam by 45° as the beam passes through it toward the DG 310. A significance of this rotation is that a beam that returns along the path 330 will have its polarization state rotated again by 45°, for a total rotation of 90°, which is orthogonal to the first polarization state (i.e., orthogonal to the polarization state of EM radiation that is reflected by the PBS 306). Accordingly, the beam will pass through the PBS 306 on its return trip.

The DG 310 is configured to disperse the EM beam at frequency-dependent angles. An exemplary dispersed beam is directed along a path 340. The retro-reflective object 312 is located in the path 340. Although the DG 310 would typically simultaneously disperse an EM beam from a broadband source across a scanning space, only the portion of the dispersed beam that is incident on the retro-reflective object 312 is illustrated so as to avoid cluttering the figure. The retro-reflective object 312 retro-reflects the portion of the dispersed beam back along the path 340 to the DG 310. The DG 310 then redirects the retro-reflected beam back in the direction from which the EM beam first came—in other words, onto the path 330, through the Faraday reflector 308, to the PBS 306.

As previously described, the PBS 306 initially reflected the EM beam because the polarization state of the EM beam was a first polarization state. Since the beam passed through the Faraday reflector 308 on its path toward the retro-reflective object 312, and the retro-reflected beam passed through the Faraday reflector 308 on the return path from the retro-reflective object 312, the retro-reflected beam is in the second polarization state (i.e., is orthogonal to the first polarization state). Accordingly, as previously described, the PBS 306 now allows the retro-reflected beam to pass through the PBS 306 on path 350 to the wavemeter 314. The wavemeter 314 measures a frequency of the retro-reflected beam. The processor 316 receives the measured frequency from the wavemeter 314 and determines the angular position of the retro-reflective object 312 using the measured frequency.

FIG. 3B is intended to illustrate an example of a system 300B that uses a narrowband tunable source to determine the position of the retro-reflective object 312. The system 300B is similar to the subsystem 300A (FIG. 3A) described previously, but uses a tunable source 352 in place of a broadband source 302 and a photodetector 364 in place of a wavemeter 314.

In operation, the tunable source 352 provides an EM beam having a time-dependent variable frequency along the path 360 to the PBS 306, which redirects the EM beam along the path 370 through the Faraday rotator 308 to the DG 310. The DG 310 disperses the EM beam at an angle that is dependent upon the frequency of the EM beam. Since the EM beam in this case is of a variable frequency, the EM beam is dispersed as a dispersed beam at an angle associated with the variable frequency. Assuming that the retro-reflective object 312 is positioned in the angular position associated with the dispersed beam, the DG 310 disperses the EM beam along the path 380 to the retro-reflective object 312. The retro-reflective object 312 retro-reflects the dispersed beam back to the DG 310 along the path 380. The DG 310 then redirects the retro-reflected beam back along the path 370 through the Faraday rotator 308 to the PBS 306, through which the retro-reflected beam passes to the photodetector 364, where the retro-reflected beam is detected.

Unlike as was the case with the broadband source 302 (FIG. 3A), at time t, the tunable source 352 may have a known frequency $f_t$, where the frequency is obtained by a known technique. The known techniques include utilizing tunable laser sources that have their frequency controlled by an applied voltage where there is a fixed relationship between the voltage applied, for example, to a MEMs actuator integrated into the laser and the frequency output of the laser. Alternatively, a wavemeter may be integrated into a laser and one or more optical etalons sample a portion of the laser output to provide signals to one or more detectors whose outputs are used to determine the optical frequency. By making use of one of these known techniques, the frequency $f_t$ of the tunable source 352 at time t is known. Accordingly, if the photodetector 364 detects the retro-reflected beam at time t, it may be inferred that the retro-reflected beam is associated with an EM beam having a frequency $f_t$. The processor 376 determines the angular position of the retro-reflective object 312 using the known frequency $f_t$ when output from the photodetector indicates the retro-reflected beam has been detected at time t. It should be noted that it takes a relatively small amount of time for the EM beam from the tunable source 352 to reach the photodetector 364 so, for the purposes of example, the delay is ignored.

It should further be noted that a wavemeter may be used in place of a photodetector with a tunable source. Wavemeters are well-known and can be constructed from optical etalons, or through the use of dispersive devices such as optical diffraction gratings or any device that exhibits a measurable property, such as optical transmission, that depends on wavelength. In an alternative embodiment that includes a wavemeter, the system may receive no feedback from the tunable source regarding the frequency of the tunable source at time t. Accordingly, the wavemeter measures the frequency of each detected retro-reflected beam.

By operating two angular position determination subsystems together, two angular positions may be determined with respect to a retro-reflective object, and the coordinates of the retro-reflective object derived therefrom, as described previously with reference to FIG. 1. It should be noted that in a two-dimensional embodiment, such a system may have a limited tracking range of the retro-reflective object in a direction orthogonal to the two-dimensional scanning space. This limited tracking range may be improved by using an elliptical EM beam, as described with reference to FIG. 4.

Figure 4:
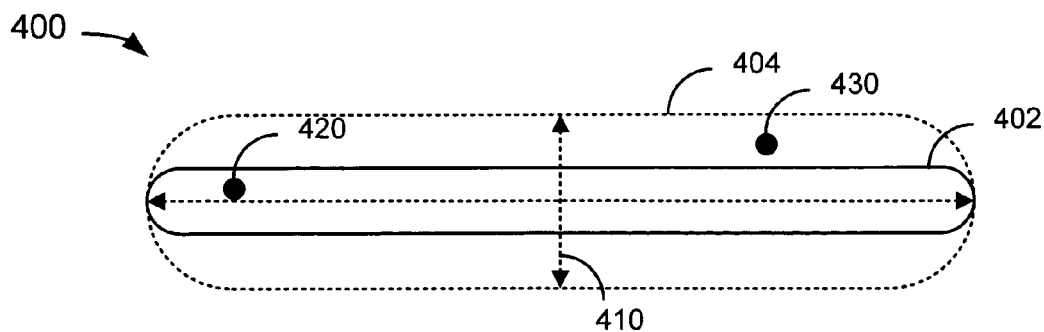
FIG. 4 illustrates the tracking range along a direction orthogonal to a two-dimensional scanning space according to the invention.

FIG. 4 illustrates the tracking range along a direction orthogonal to a two-dimensional scanning space according to the invention. The scanning space includes a first scanning space 402 and a second scanning space 404. A coordinate axis 410 is orthogonal to the scanning spaces. A first point 420 is located inside the first scanning space 402 and a second point 430 is located inside the second scanning space 404.

A system associated with the first scanning space 402 would be able to detect the position of a retro-reflector at point 420, but not at point 430. This problem can be ameliorated somewhat by enlarging the scanning space in a third (orthogonal) dimension by using expanded beams such as, for example, elliptical EM beams. The enlarged scanning space is illustrated by the second scanning space 404. By using, for example, elliptical EM beams, a retro-reflector located at point 430 would be detectable by the system. Although the tolerance of the system is improved with respect to a retro-reflective object being raised or lowered away from the scanning space 402, the system is still referred to as two-dimensional because the position of the retro-reflective object in the orthogonal direction is not measured.

Figure 5:
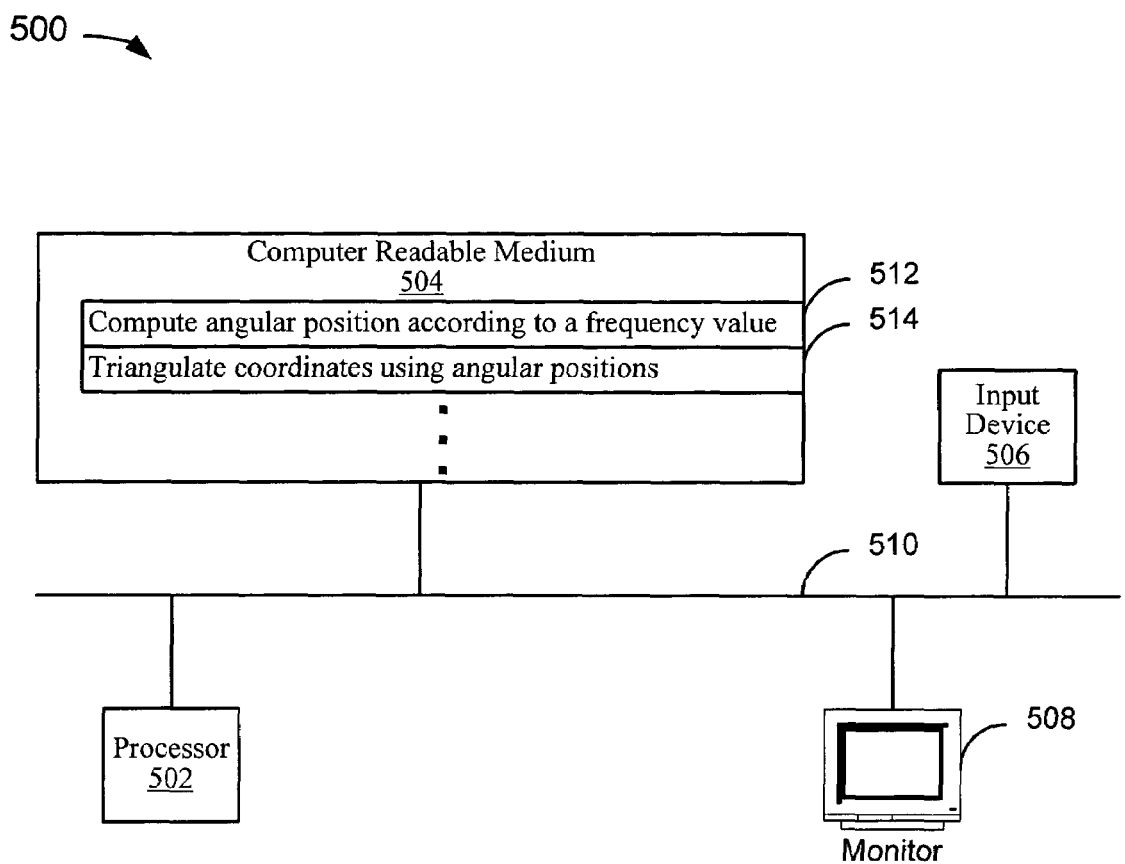
FIG. 5 is a block diagram of a position determination computer system according to the invention.

FIG. 5 is a block diagram of an EM position determination computer system 500 according to the invention. The system 500 includes a processor 502, a computer readable medium 504, an input device 506, and a monitor 508. Each of the components is coupled to a bus 510. The computer readable medium includes program instructions 512 and 514. The processor 502 executes the program instructions. The program instructions 512 compute an angular position according to a frequency value when the input device 506 provides an input indicating an EM signal has been detected. The program instructions 514 triangulate coordinates using two or more angular positions. The coordinates are output to the bus 510 for, for example, display as an arrow, a cursor, or some other indicator on the monitor 508. The coordinates may be in two or three dimensions.

The system 500 may be used with the system 100 (FIG. 1). In fact, in an embodiment, the processor 502 includes the processor 120 (FIG. 1) and the input device 506 includes the subsystems 101 and 111 (FIG. 1).

Figure 6A:
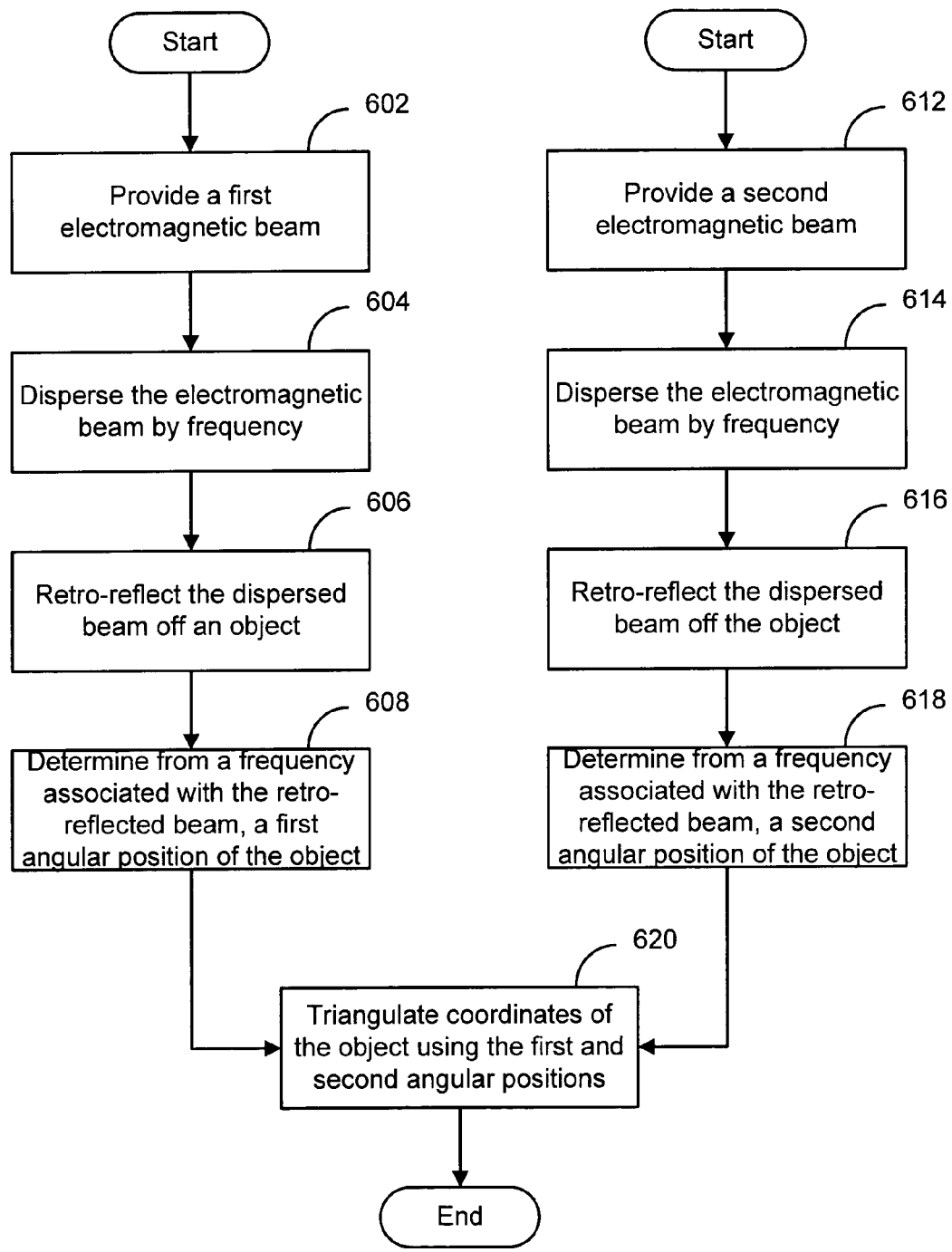
FIGS. 6A and 6B depict flowcharts of methods for determining positions of retro-reflective objects according to the invention.

FIG. 6A illustrates a flowchart 600A of a method for determining the position of a retro-reflective object in a two-dimensional scanning space. The flowchart 600A has two starting points. The flowchart 600A starts from the first starting point with providing a first EM beam at step 602, dispersing the EM beam by frequency at step 604, retro-reflecting the dispersed beam off of a retro-reflective object at step 606, and determining a first angular position of the retro-reflective object from the frequency of the retro-reflected beam at step 608. The first EM beam may be from a broadband source, in which case, at a time t, the EM beam is dispersed simultaneously across a range of wavelengths. If the EM beam is from a swept source, the EM beam is dispersed across a range of wavelengths as a function of time.

The flowchart 600A starts from the second starting point with providing a second EM beam at step 612, dispersing the EM beam into a dispersed beam at step 614, retro-reflecting the dispersed beam off of a retro-reflective object at step 616, and determining a second angular position of the retro-reflective object from the frequency of the retro-reflected beam at step 618. Like the first EM beam, the second EM beam may be from a broadband or swept source. When both the first angular position and the second angular position have been determined (at steps 608 and 618), the coordinates of the retro-reflective object may be triangulated using the first and second angular positions at step 620. Then the flowchart 600A ends.

Figure 6B:
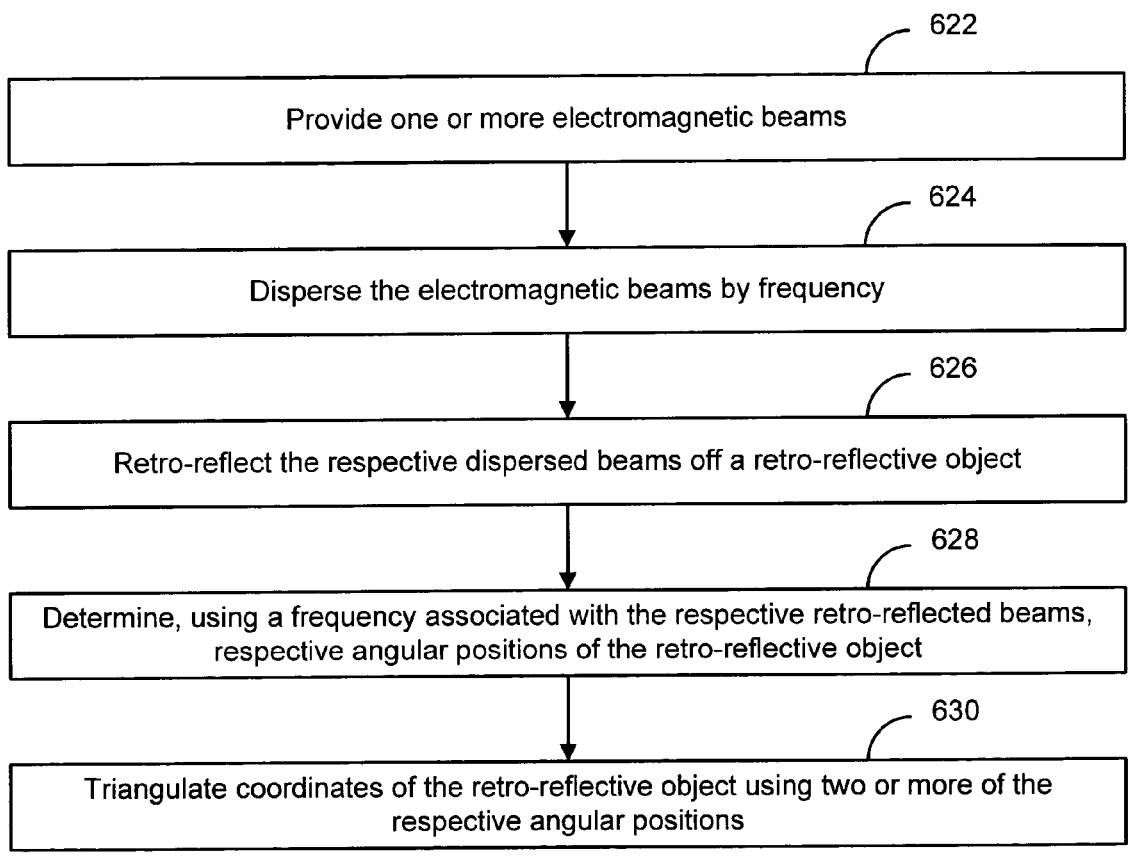

FIG. 6B illustrates a flowchart 600B of a method for determining the position of a retro-reflective object in a two- or three-dimensional scanning space. At step 622, one or more EM beams are provided. At step 624, the EM beams are dispersed into respective dispersed beams. At step 626, the respective dispersed beams are retro-reflected off a retro-reflective object. At step 628, the respective angular positions of the object are determined using a frequency associated with the respective retro-reflected beams. At step 630, the coordinates of the object are triangulated using two or more of the respective angular positions. If three or more of the respective angular positions are used, the spatial (i.e., three-dimensional) coordinates of the object may be triangulated.

The term disperse when used with reference to an EM beam is defined broadly herein to include reflecting, diffracting, or otherwise directing the EM beam. Dispersing the EM beam could include splitting the EM beam into frequency-dependent bands or, if the EM beam has a (central) frequency, redirecting the EM beam according to its frequency.

The term broadband source, as used herein, is defined broadly to include broadband sources that provide spectrally broadband EM beams.

Although specific embodiments of the invention have been described and illustrated, the invention is not to be limited to the specific forms or arrangements of parts as described and illustrated herein. The invention is limited only by the claims.

What is claimed is:

1. A method for determining the position of an object, comprising:
providing at least two electromagnetic (EM) beams, said at least two EM beams being provided from two different EM sources;
dispersing said at least two EM beams, respectively, into a scanning space by frequency;
retro-reflecting at least a portion of said respective dispersed beams off an object positioned within said scanning space;
determining, in response to frequencies associated with said retro-reflected beams, respective angular positions of said object; and
triangulating coordinates of said object using two or more of said respective angular positions;
wherein said at least two EM beams are elliptical shaped EM beams so as to improve tracking range of said retro-reflective object along a direction orthogonal to said scanning space, wherein the elliptical shaped EM beams are EM beams that have an elliptical shaped beam spot.

2. The method of claim 1, further comprising:
triangulating spatial coordinates of said object using three or more of said respective angular positions.

3. The method of claim 1, wherein said at least two EM beams are broadband beams.

4. The method of claim 1, wherein said at least two EM beams are narrowband beams that are tuned or swept across a range of frequencies.

5. The method of claim 1, further comprising:
rotating polarization state of said at least two EM beams; and
rotating polarization state of said retro-reflected beams, such that said at least two EM beams and said retro-reflected beams are treated differently by polarizing beam splitters located in respective paths.

6. A position determination system, comprising:
at least two electromagnetic (EM) sources that provide EM beams;
at least two beam dispersion devices that respectively disperse said at least two EM beams into a scanning space by frequency, wherein said system is configured to be responsive to a retro-reflective object positioned within said scanning space such that said retro-reflective object retro-reflects, at least a portion of said respective dispersed beams;
at least two receptors that receive said respective retro-reflected beams and provide signals for determining respective angular positions of said retro-reflective object; and
a processor, in signal communication with said at least two receptors, that determines, in response to frequencies associated with said respective retro-reflective beams, said respective angular positions of said retro-reflective object;
wherein said processor triangulates coordinates of said retro-reflective object using at least two of said respective angular positions; and
wherein said at least two EM sources provide elliptical shaped EM beams so as to improve tracking range of said retro-reflective object along a direction orthogonal to said scanning space, wherein the elliptical shaped EM beams are EM beams that have an elliptical shaped beam spot.

7. The system of claim 6, wherein said processor triangulates spatial coordinates of said retro-reflective object using at least three of said respective angular positions.

8. The system of claim 6, wherein said at least two EM sources include respective narrowband tunable sources for providing said respective EM beams in respective frequencies.

9. The system of claim 8, wherein said respective frequencies are known and wherein:
said at least two receptors include respective photodetectors configured to detect receipt of said respective retro-reflected beams; and
said processor is configured to use said respective known frequencies to determine respective angular positions when receipt of said respective retro-reflected beams is detected.

10. The system of claim 8, wherein:
said at least two receptors include respective wavemeters configured to detect receipt of said respective retro-reflected beams; and
said processor is configured to determine that said respective retro-reflected beams have said respective frequencies and use said respective frequencies to determine respective angular positions when receipt of said respective retro-reflected beams is detected.

11. The system of claim 6, wherein:
said at least two EM sources include respective broadband sources that provide said respective EM beams;
said at least two receptors include respective wavemeters that determine frequencies of said respective retro-reflected beams;
said processor is configured to use said frequencies of said respective retro-reflected beams to determine said respective angular positions when receipt of said respective retro-reflected beams is detected.

12. The system of claim 6, wherein:
said at least two beam dispersion devices are selected from said group of beam dispersion devices consisting of a diffraction grating, a prism, and a holographic element.

13. The system of claim 6, further comprising:
at least two partially reflective surfaces that direct said respective EM beams from said at least two EM sources to said at least two beam dispersion devices and that pass said respective retro-reflected beams to said at least two receptors.

14. The system of claim 13, wherein said at least two partially reflective surfaces include polarized beam splitters, wherein said system further comprises:
at least two polarization state rotators positioned between respective polarized beam splitters and said retro-reflected object, wherein
said polarization state of said respective EM beams causes said respective polarized beam splitters to reflect said respective EM beams, and wherein
said at least two polarization state rotators rotate said polarization state of said respective EM beams and said respective retro-reflected beams such that said polarization state of said respective retro-reflected beams causes said respective polarized beam splitters to pass said respective retro-reflected beams to said respective receptors.

15. A position determination system, comprising:
at least two electromagnetic (EM) sources that provide EM beams;
at least two beam dispersion devices that respectively disperse said at least two EM beams into a scanning space by frequency, wherein said system is configured to be responsive to a retro-reflective object positioned within said scanning space such that said retro-reflective object retro-reflects, at least a portion of said respective dispersed beams;

at least two receptors that receive said respective retro-reflected beams and provide signals for determining respective angular positions of said retro-reflective object;

a processor, in signal communication with said at least two receptors, that determines, in response to frequencies associated with said respective retro-reflective beams, said respective angular positions of said retro-reflective object;

wherein said processor triangulates coordinates of said retro-reflective object using at least two of said respective angular positions;

wherein said at least two EM sources provide elliptical shaped EM beams so as to improve tracking range of said retro-reflective object along a direction orthogonal to said scanning space, wherein the elliptical shaped EM beams are EM beams that have an elliptical shaped beam spot.

* * * * *